United States Patent
Nishijima et al.

(10) Patent No.: US 12,534,556 B2
(45) Date of Patent: Jan. 27, 2026

(54) CURABLE COMPOSITION, CURED ARTICLE USING SAME, AND METHOD FOR PRODUCING CURED ARTICLE

(71) Applicant: KURARAY CO., LTD., Okayama (JP)

(72) Inventors: Yuki Nishijima, Niigata (JP); Daiki Noguchi, Niigata (JP); Takashi Fukumoto, Niigata (JP)

(73) Assignee: KURARAY CO., LTD., Okayama (JP)

( * ) Notice: Subject to any disclaimer, the term of this patent is extended or adjusted under 35 U.S.C. 154(b) by 723 days.

(21) Appl. No.: 17/794,054

(22) PCT Filed: Jan. 20, 2021

(86) PCT No.: PCT/JP2021/001908
§ 371 (c)(1),
(2) Date: Jul. 20, 2022

(87) PCT Pub. No.: WO2021/149738
PCT Pub. Date: Jul. 29, 2021

(65) Prior Publication Data
US 2023/0073744 A1     Mar. 9, 2023

(30) Foreign Application Priority Data
Jan. 21, 2020   (JP) ................. 2020-007705

(51) Int. Cl.
C08F 216/12    (2006.01)
C08F 220/14    (2006.01)
C08L 33/12     (2006.01)

(52) U.S. Cl.
CPC ........ *C08F 216/125* (2013.01); *C08F 220/14* (2013.01); *C08L 33/12* (2013.01)

(58) Field of Classification Search
CPC .................................................. C08F 216/12
See application file for complete search history.

(56) References Cited

U.S. PATENT DOCUMENTS 3,644,568 A    2/1972   Tilley et al.
2019/0270864 A1*  9/2019   Noguchi ............... C08L 101/00

FOREIGN PATENT DOCUMENTS

| CN | 105271900 A | 1/2016 |
|---|---|---|
| JP | S61-101518 A | 5/1986 |
| JP | S63-130610 A | 6/1988 |
| JP | H5-78459 A | 3/1993 |
| JP | 2002-265531 A | 9/2002 |
| WO | 2019/107252 A1 | 6/2019 |
| WO | 2019/208259 A1 | 10/2019 |

OTHER PUBLICATIONS

Official communication issued in EP Patent Application No. 21745014. 7, Oct. 16, 2023.
ISR issued in International Patent Application No. PCT/JP2021/001908, Apr. 6, 2021, translation.
IPRP/WO issued in International Patent Application No. PCT/JP2021/001908, Apr. 6, 2021, translation.

\* cited by examiner

*Primary Examiner* — Wenwen Cai
(74) *Attorney, Agent, or Firm* — GREENBLUM & BERNSTEIN, P.L.C.

(57) ABSTRACT

A curable composition includes, per 100 parts by mass of a curable compound, 0.1 to 10.0 parts by mass of a compound (A) including a structure represented by the following general formula (I), and 0.01 to 10.0 parts by mass of a base (B):

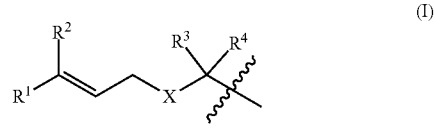

where X represents a chalcogen atom, $R^1$ and $R^2$ each independently represent an alkyl group having 1 to 6 carbon atoms, an alkenyl group having 2 to 6 carbon atoms, an aryl group, or an aralkyl group, and $R^3$ and $R^4$ each independently represent a hydrogen atom, an alkyl group having 1 to 6 carbon atoms, an alkenyl group having 2 to 6 carbon atoms, an aryl group, or an aralkyl group.

4 Claims, No Drawings

CURABLE COMPOSITION, CURED ARTICLE USING SAME, AND METHOD FOR PRODUCING CURED ARTICLE

TECHNICAL FIELD

The present invention relates to a curable composition containing a particular unsaturated double bond-containing compound, to a cured product using the composition, and to a method for producing a cured product.

BACKGROUND ART

A radical polymerizable monomer, such as a (meth) acrylic ester, for use in a coating material, a paint, a 3D modeling material, etc. can be polymerized and cured through the generation of a radical from a polymerization initiator by heating or irradiation with active energy rays. When such a radical polymerizable monomer is used in a paint, etc., the monomer is cured generally in an air atmosphere. Upon the curing, the polymerization reaction is likely to be inhibited by oxygen in the air, causing the problems of retarded curing, stickiness of the surface of the cured product, etc.

Patent documents 1 and 2 have proposed, as a method for solving these problems, a technique which involves adding an oxygen absorber to a resin. Patent documents 3 and 4 describe a technique which involves using allyl glycidyl ether or the like as such an oxygen absorber. Patent document 5 has proposed a curable composition comprising a polymer including structural units derived from a particular unsaturated double bond-containing compound having oxygen absorbing properties, a polyfunctional monomer, and a radical polymerizable resin.

CITATION LIST

Patent Literature

Patent document 1: Japanese Patent Laid-Open Publication No. S63-130610
Patent document 2: Japanese Patent Laid-Open Publication No. H5-78459
Patent document 3: Japanese Patent Laid-Open Publication No. S61-101518
Patent document 4: U.S. Pat. No. 3,644,568
Patent document 5: International Publication No. WO 2019/208259

SUMMARY OF INVENTION

Technical Problem

The use of an unsaturated double bond-containing compound having oxygen absorbing properties, as described in patent document 5, can reduce the concentration of oxygen in the composition, thereby enhancing the reactivity of the composition. On the other hand, the composition has the problem of reduced storage stability.

It is therefore an object of the present invention to provide a curable composition which is excellent in storage stability and also in reactivity after its storage, to provide a cured product using the composition, and to provide a method for producing a cured product.

Solution to Problem

The present inventors, through intensive studies to achieve the object, have found that the use of a combination of a compound, which has a particular structure containing an unsaturated double bond, and a base in particular amounts can provide a curable composition which has enhanced storage stability and has excellent reactivity even after it is stored for a period of time. The present invention has been accomplished based on this finding.

Thus, the present invention provides the following [1] to [9].

[1] A curable composition comprising, per 100 parts by mass of a curable compound, 0.1 to 10.0 parts by mass of a compound (A) including a structure represented by the following general formula (I), and 0.01 to 10.0 parts by mass of a base (B):

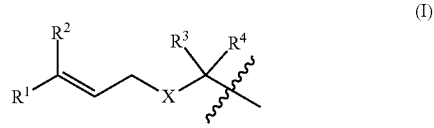

where X represents a chalcogen atom, $R^1$ and $R^2$ each independently represent an alkyl group having 1 to 6 carbon atoms, an alkenyl group having 2 to 6 carbon atoms, an aryl group, or an aralkyl group, and $R^3$ and $R^4$ each independently represent a hydrogen atom, an alkyl group having 1 to 6 carbon atoms, an alkenyl group having 2 to 6 carbon atoms, an aryl group, or an aralkyl group.

[2] The curable composition as described in [1] above, wherein $R^1$ and $R^2$ in the general formula (I) are each independently an alkyl group having 1 to 4 carbon atoms.

[3] The curable composition as described in [1] or [2] above, wherein X in the general formula (I) is an oxygen atom.

[4] The curable composition as described in [1] above, wherein the compound (A) including a structure represented by the general formula (I) is a compound represented by the following general formula (II):

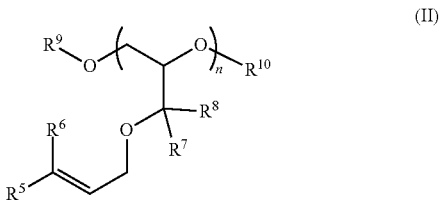

where $R^5$ and $R^6$ each independently represent an alkyl group having 1 to 6 carbon atoms, an alkenyl group having 2 to 6 carbon atoms, an aryl group, or an aralkyl group, $R^7$ and $R^8$ each independently represent a hydrogen atom, an alkyl group having 1 to 6 carbon atoms, an alkenyl group having 2 to 6 carbon atoms, an aryl group, or an aralkyl group, $R^9$ represents a hydrogen atom, an alkyl group having 1 to 6 carbon atoms, an alkenyl group having 2 to 6 carbon atoms, an aryl group, or an aralkyl group, $R^{10}$ represents a hydrogen atom, a (meth)acryloyl group, a 4-vinylphenyl group, or an alkenyl group having 2 to 6 carbon atoms, and n is an arbitrary integer.

[5] The curable composition as described in [1] above, wherein the compound (A) including a structure represented by the general formula (I) is a compound represented by the following general formula (III):

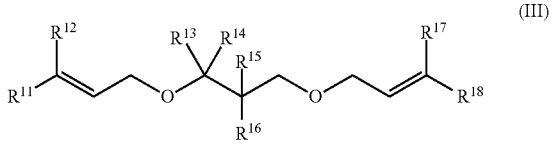

(III)

where $R^{11}$, $R^{12}$, $R^{17}$ and $R^{18}$ each independently represent an alkyl group having 1 to 6 carbon atoms, an alkenyl group having 2 to 6 carbon atoms, an aryl group, or an aralkyl group, $R^{13}$ and $R^{14}$ each independently represent a hydrogen atom, an alkyl group having 1 to 6 carbon atoms, an alkenyl group having 2 to 6 carbon atoms, an aryl group, or an aralkyl group, $R^{15}$ represents a hydrogen atom or a methyl group, and $R^{16}$ represents a hydrogen atom, a (meth)acryloyloxy group, a 4-vinylphenoxy group, or an alkenyloxy group having 2 to 6 carbon atoms.

[6] The curable composition as described in any one of [1] to [5] above, wherein the base (B) is at least one selected from sodium hydroxide, sodium methoxide, triethylamine, and trioctylamine.

[7] A cured product obtained by curing the curable composition as described in any one of [1] to [6] above.

[8] A method for producing a cured product, comprising curing the curable composition as described in any one of [1] to [6] above.

[9] The method for producing a cured product as described in [8] above, comprising the steps of: neutralizing the base (B) contained in the curable composition to obtain a neutralized product; and curing the neutralized product.

Advantageous Effects of Invention

The present invention makes it possible to provide a curable composition which is excellent in storage stability and also in reactivity after its storage, to provide a cured product using the composition, and to provide a method for producing a cured product.

DESCRIPTION OF EMBODIMENTS

[Curable Composition]

The curable composition of the present invention comprises, per 100 parts by mass of a curable compound, 0.1 to 10.0 parts by mass of a compound (A) including a structure represented by the following general formula (I), and 0.01 to 10.0 parts by mass of a base (B):

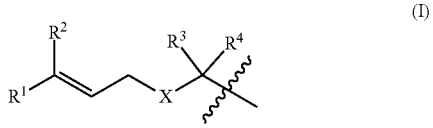

(I)

where X represents a chalcogen atom, $R^1$ and $R^2$ each independently represent an alkyl group having 1 to 6 carbon atoms, an alkenyl group having 2 to 6 carbon atoms, an aryl group, or an aralkyl group, and $R^3$ and $R^4$ each independently represent a hydrogen atom, an alkyl group having 1 to 6 carbon atoms, an alkenyl group having 2 to 6 carbon atoms, an aryl group, or an aralkyl group.

Owing to the use of a combination of the particular compound having an unsaturated double bond and the base, the curable composition of the present invention has enhanced storage stability and exhibits excellent reactivity even after it is stored for a period of time. This is considered to be for the following reason.

In a curable composition including a radical polymerizable monomer such as a (meth)acrylic ester, oxygen contained in the composition inhibits radical polymerization. It is therefore difficult to obtain a desired cured product. On the other hand, when a curable compound is blended with a compound having a structure represented by the general formula (I) where X is, for example, an oxygen atom, a moiety derived from an allyl ether backbone captures oxygen through a radical-associated reaction. This promotes the progress of a polymerization reaction, thus making it easier to obtain a desired cured product. However, because of the decrease in the concentration of oxygen in the composition, a radical polymerization reaction proceeds during storage of the composition. Thus, the composition has the problem of reduced storage stability.

On the other hand, when a compound having a structure represented by the general formula (I) is used in combination with a base, the base draws out hydrogen in the allyl position. Therefore, an ionic reaction proceeds preferentially, while a radical-associated oxygen capturing reaction is retarded. Thus, the oxygen absorbing performance of the compound having a structure represented by the general formula (I) degrades, whereby the concentration of oxygen in the curable composition is less likely to decrease, leading to enhanced storage stability of the composition.

The drawing of hydrogen from the allyl position is inhibited by neutralizing the base upon curing of the curable composition. This enhances the oxygen absorbing performance of the compound having a structure represented by the general formula (I), and therefore reduces the concentration of oxygen in the curable composition, resulting in an enhancement of the reactivity of the composition.

<Curable Compound>

The curable composition of the present invention contains a curable compound. While there is no particular limitation on the curable compound as long as it is a monomer copolymerizable with the below-described compound (A), at least one selected from a monofunctional monomer (M1) and a polyfunctional monomer (M2) can be used, and a monofunctional monomer (M1) is preferred because the effect of the present invention can be easily achieved.

A monomer having one reactive double bond is preferably used as the monofunctional monomer (M1). Examples of such monomers include a vinyl monomer such as styrene, 2-methylstyrene, vinyl acetate, or vinyl chloride; an alkyl (meth)acrylate such as methyl (meth)acrylate, propyl (meth)acrylate, butyl (meth)acrylate, pentyl (meth)acrylate, or hexyl (meth)acrylate; a (meth)acrylic ester having a hydroxy group, such as 2-hydroxyethyl (meth)acrylate, hydroxypropyl (meth)acrylate, hydroxybutyl (meth)acrylate, or a caprolactone-modified 2-hydroxyethyl (meth)acrylate; a (meth)acrylate having an alkylene glycol structure, such as methoxydiethylene glycol (meth)acrylate, ethoxydiethylene glycol (meth)acrylate, isooctyloxydiethylene glycol (meth)acrylate, phenoxytriethylene glycol (meth)acrylate, methoxytriethylene glycol (meth)acrylate, or methoxypolyethylene glycol (meth)acrylate; a silane- or silyl-terminated (meth)acrylate such as 2-trimethylsilyloxyethyl (meth)acrylate; a (meth)acrylic ester having a terminal epoxy group, such as glycidyl (meth)acrylate or 3,4-epoxycyclohexylmethyl (meth)acrylate; and an unsaturated dicarboxylic acid such as maleic anhydride or a derivative thereof. These monofunctional monomers may be used either singly or in a combination of two or more.

As used herein, "(meth)acrylate" refers to acrylate or methacrylate. The same holds true for similar wordings.

An alkyl (meth)acrylate is preferably used as the monofunctional monomer (M1) from the viewpoint of better achieving the effect of the present invention. In particular, methyl (meth)acrylate, propyl (meth)acrylate, butyl (meth)acrylate, pentyl (meth)acrylate, and hexyl (meth)acrylate are preferred, and methyl (meth)acrylate is more preferred.

There is no particular limitation on the type of the polyfunctional monomer (M2), and any compound having two or more polymerizable groups in the molecule can be preferably used. The polymerizable group may be a radical polymerizable group such as a (meth)acryloyl group or a vinyl group. The polyfunctional monomer is preferably a compound having two or more radical polymerizable groups in the molecule. An exemplary polyfunctional monomer (M2) is a multi(meth)acrylate having two or more (meth)acryloyloxy groups in the molecule. The multi(meth)acrylate may be a hydroxy group-containing multi(meth)acrylate. Either a single type of polyfunctional monomer or two or more types of polyfunctional monomers may be contained in the curable composition of the present invention.

A (meth)acrylate of a polyhydric alcohol, such as a diol or triol, can be used as the multi(meth)acrylate. Examples of the multi(meth)acrylate include ethylene glycol di(meth)acrylate, diethylene glycol di(meth)acrylate, dipropylene glycol di(meth)acrylate, tripropylene glycol di(meth)acrylate, 1,3-butanediol di(meth)acrylate, 1,4-butanediol di(meth)acrylate, 1,6-hexamethylene di(meth)acrylate, neopentyl glycol di(meth)acrylate, 1,9-nonanediol di(meth)acrylate, 1,10-decanediol di(meth)acrylate, tricyclodecanedimethanol di(meth)acrylate, glycerin di(meth)acrylate, di(meth)acrylate of hydrogenated bisphenol A or hydrogenated bisphenol F, polyethylene glycol di(meth)acrylate, polypropylene glycol di(meth)acrylate, pentaerythritol tetra(meth)acrylate, dipentaerythritol hexa(meth)acrylate, and trimethylolpropane tri(meth)acrylate.

Examples of the hydroxy group-containing multi(meth)acrylate include glycerol di(meth)acrylate, trimethylolpropane di(meth)acrylate, pentaerythritol tri(meth)acrylate, pentaerythritol di(meth)acrylate, and dipentaerythritol monohydroxy penta(meth)acrylate.

Among these polyfunctional monomers, a multi(meth)acrylate is preferred, and 1,6-hexamethylene di(meth)acrylate, 1,9-nonanediol di(meth)acrylate, and pentaerythritol tri(meth)acrylate are more preferred from the viewpoint of the water resistance of a cured product of the composition.

The content of the curable compound in the curable composition of the present invention is preferably 70.0 to 99.0% by mass, more preferably 80.0 to 99.0% by mass, and even more preferably 90.0 to 99.0% by mass. When the content of the curable compound is equal to or higher than the lower limit, a cured product, obtained by curing the curable compound, has enhanced strength. When the content of the curable compound is equal to or lower than the upper limit, the content of the compound (A) and the content of the base (B) are relatively high, and therefore the curable compound has enhanced storage stability.

<Compound (A) Including a Structure Represented by the General Formula (I)>

In the general formula (I), X represents a chalcogen atom and is preferably an oxygen atom or a sulfur atom, more preferably an oxygen atom from the viewpoint of enhancing the storage stability of the curable composition.

In the general formula (I), $R^1$ and $R^2$ each independently represent an alkyl group having 1 to 6 carbon atoms, an alkenyl group having 2 to 6 carbon atoms, an aryl group, or an aralkyl group.

Examples of the alkyl group having 1 to 6 carbon atoms, represented by $R^1$ and $R^2$, include a methyl group, an ethyl group, an n-propyl group, an isopropyl group, an n-butyl group, an isobutyl group, a sec-butyl group, a tert-butyl group, an n-pentyl group, an isopentyl group, a neopentyl group, an n-hexyl group, a cyclopropyl group, a cyclobutyl group, a cyclopentyl group, and a cyclohexyl group.

Examples of the alkenyl group having 2 to 6 carbon atoms, represented by $R^1$ and $R^2$, include a vinyl group, an allyl group, a propenyl group, an isopropenyl group, a butenyl group, an isobutenyl group, a pentenyl group, a prenyl group, a hexenyl group (such as a cis-3-hexenyl group), and a cyclohexenyl group.

The aryl group, represented by $R^1$ and $R^2$, is preferably an aryl group having 6 to 20 carbon atoms, such as a phenyl group, a tolyl group, a xylyl group, or a naphthyl group.

The aralkyl group, represented by $R^1$ and $R^2$, is preferably an aralkyl group having 7 to 20 carbon atoms, such as a benzyl group, a 2-phenylethyl group, a 2-naphthylethyl group, or a diphenylmethyl group.

In particular, it is preferred that $R^1$ and $R^2$ be each independently an alkyl group having 1 to 6 carbon atoms or an alkenyl group having 2 to 6 carbon atoms, more preferably an alkyl group having 1 to 4 carbon atoms, and even more preferably a methyl group from the viewpoint of enhancing the storage stability of the curable composition and from the viewpoint of enhancing the reactivity after storage of the curable composition.

In the general formula (I), $R^3$ and $R^4$ each independently represent a hydrogen atom, an alkyl group having 1 to 6 carbon atoms, an alkenyl group having 2 to 6 carbon atoms, an aryl group, or an aralkyl group. Examples of each of the alkyl group having 1 to 6 carbon atoms, the alkenyl group having 2 to 6 carbon atoms, the aryl group, and the aralkyl group represented by $R^3$ and $R^4$ are the same as those described above with reference to $R^1$ and $R^2$, and therefore a duplicate description thereof will be omitted.

It is preferred that $R^3$ and $R^4$ be each independently a hydrogen atom, an alkyl group having 1 to 3 carbon atoms, an alkenyl group having 2 or 3 carbon atoms, or an aryl group, more preferably a hydrogen atom or a methyl group, and even more preferably a hydrogen atom. In particular, both $R^3$ and $R^4$ are preferably a hydrogen atom from the viewpoint of enhancing the oxygen absorbing performance of a polymer obtained.

The compound (A) including a structure represented by the general formula (I) is preferably a compound represented by the following general formula (II) or (III), more preferably a compound represented by the following general formula (II-a) or (III) from the viewpoint of enhancing the storage stability of the curable composition, from the viewpoint of enhancing the reactivity of the curable composition after it is stored for a period of time, etc.

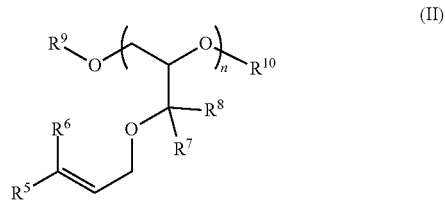

In the formula (II), $R^5$ and $R^6$ each independently represent an alkyl group having 1 to 6 carbon atoms, an alkenyl group having 2 to 6 carbon atoms, an aryl group, or an aralkyl group. $R^7$ and $R^8$ each independently represent a hydrogen atom, an alkyl group having 1 to 6 carbon atoms, an alkenyl group having 2 to 6 carbon atoms, an aryl group, or an aralkyl group. $R^9$ represents a hydrogen atom, an alkyl group having 1 to 6 carbon atoms, an alkenyl group having 2 to 6 carbon atoms, an aryl group, or an aralkyl group. $R^{10}$ represents a hydrogen atom, a (meth)acryloyl group, a 4-vinylphenyl group, or an alkenyl group having 2 to 6 carbon atoms. n is an arbitrary integer.

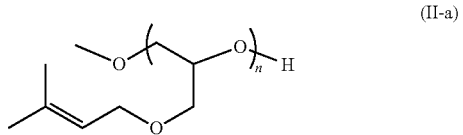

(II-a)

The compound represented by the general formula (II-a) has a weight average molecular weight (Mw), as calculated in terms of polystyrene, of 200 to 50,000.

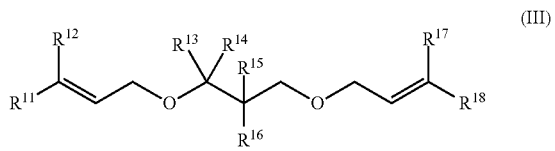

(III)

In the general formula (III), $R^{11}$, $R^{12}$, $R^{17}$ and $R^{18}$ each independently represent an alkyl group having 1 to 6 carbon atoms, an alkenyl group having 2 to 6 carbon atoms, an aryl group, or an aralkyl group. $R^{13}$ and $R^{14}$ each independently represent a hydrogen atom, an alkyl group having 1 to 6 carbon atoms, an alkenyl group having 2 to 6 carbon atoms, an aryl group, or an aralkyl group. $R^{15}$ represents a hydrogen atom or a methyl group, and $R^{16}$ represents a hydroxy group, a (meth)acryloyloxy group, a 4-vinylphenoxy group, or an alkenyloxy group having 2 to 6 carbon atoms.

$R^5$, $R^6$, $R^7$ and $R^8$ in the general formula (II) are the same as $R^1$, $R^2$, $R^3$ and $R^4$, respectively, in the general formula (I), and therefore a duplicate description thereof will be omitted.

In the general formula (II), $R^9$ represents a hydrogen atom, an alkyl group having 1 to 6 carbon atoms, an alkenyl group having 2 to 6 carbon atoms, an aryl group, or an aralkyl group, and is preferably an alkyl group having 1 to 6 carbon atoms or an alkenyl group having 2 to 6 carbon atoms, more preferably a methyl group or a prenyl group.

In the general formula (II), $R^{10}$ represents a hydrogen atom, a (meth)acryloyl group, a 4-vinylphenyl group, or an alkenyl group having 2 to 6 carbon atoms, and is preferably a hydrogen atom or a (meth)acryl group.

$R^{11}$, $R^{12}$, $R^{13}$ and $R^{14}$ in the general formula (III) are the same as $R^1$, $R^2$, $R^3$ and $R^4$, respectively, in the general formula (I), and therefore a duplicate description thereof will be omitted.

In the general formula (III), $R^{15}$ represents a hydrogen atom or a methyl group, and is preferably a hydrogen atom. $R^{16}$ represents a hydrogen atom, a (meth)acryloyloxy group, a 4-vinylphenoxy group, or an alkenyloxy group having 2 to 6 carbon atoms, and is preferably a hydrogen atom or a (meth)acryloyloxy group. The alkenyloxy group having 2 to 6 carbon atoms may be a vinyloxy group having 2 to 6 carbon atoms.

In the general formula (III), $R^{17}$ and $R^{18}$ each independently represent an alkyl group having 1 to 6 carbon atoms, an alkenyl group having 2 to 6 carbon atoms, an aryl group, or an aralkyl group. Examples, including preferable ones, of these groups are the same as those described above with reference to $R^1$ and $R^2$ in the general formula (I).

In particular, it is preferred that $R^{17}$ and $R^{18}$ be each independently an alkyl group having 1 to 6 carbon atoms or an alkenyl group having 2 to 6 carbon atoms, more preferably an alkyl group having 1 to 4 carbon atoms, and even more preferably a methyl group.

There is no particular limitation on a method for producing a compound including a structure represented by the general formula (I), a compound represented by the general formula (II) or (II-a), and a compound represented by the general formula (III); these compounds can be produced by any known method or a combination of known methods.

The curable composition of the present invention contains the compound (A) including a structure represented by the general formula (I) in an amount of 0.1 to 10.0 parts by mass per 100 parts by mass of the above-described curable compound. If the content of the compound (A) is less than 0.1 parts by mass, the curable composition has a reduced reactivity after it is stored for a period of time. On the other hand, if the content of the compound (A) is more than 10.0 parts by mass, the content of the curable compound is relatively low, and therefore a desired cured product cannot be obtained. In addition, a balance between the production cost and the effect achieved will be poor. From this viewpoint, the content of the compound (A) is preferably 0.3 to 5.0 parts by mass, more preferably 0.5 to 3.0 parts by mass, and even more preferably 0.7 to 2.5 parts by mass.

<Base (B)>

The curable composition of the present invention contains the base (B) in an amount of 0.01 to 10.0 parts by mass per 100 parts by mass of the curable compound. According to the present invention, the base (B) draws out hydrogen in the allyl position of the compound (A). Therefore, an ionic reaction proceeds preferentially, while a radical-associated oxygen capturing reaction is retarded. Consequently, the concentration of oxygen in the curable composition is kept constant, leading to enhanced storage stability of the curable composition. On the other hand, the oxygen capturing reaction is promoted by neutralizing the base upon curing of the curable composition. This decreases the concentration of oxygen in the curable composition, leading to enhanced reactivity of the curable composition.

There is no particular limitation on the base (B) usable in the curable composition of the present invention. The base (B) may be an inorganic base or an organic amine, such as sodium hydride, sodium hydroxide, potassium hydroxide, sodium carbonate, sodium methoxide, potassium t-butoxide, triethylamine, tributylamine, trioctylamine, DBN (1,5-diazabicyclo[4.3.0]non-5-ene), DBU (1,8-diazabicyclo[5.4.0] undec-7-ene), methyldimetanolamine, or triethanolamine.

Among them, at least one selected from sodium hydroxide, sodium methoxide, triethylamine, and trioctylamine is preferred as the base (B) from the viewpoint of enhancing the storage stability of the curable composition.

The curable composition of the present invention contains the base (B) in an amount of 0.01 to 10.0 parts by mass per 100 parts by mass of the curable compound. If the content of the base (B) is less than 0.01 parts by mass, the reaction of drawing hydrogen from the allyl position of the compound (A) does not proceed sufficiently, resulting in a reduction in the storage stability of the curable composition. On the other hand, if the content of the base (B) is more than 10.0 parts by mass, a balance between the production cost and the effect achieved will be poor. From this viewpoint, the content of the base (B) is preferably 0.05 to 3.0 parts by mass, more preferably 0.07 to 1.0 parts by mass.
<Polymerization Initiator>

The curable composition of the present invention may further contain a polymerization initiator from the viewpoint of enhancing the curability. There is no particular limitation on the type of the polymerization initiator, and it can be appropriately selected depending on the type of the curable compound used, etc.; however, it is preferred to use a radical polymerization initiator. The radical polymerization initiator includes a heat radical polymerization initiator that generates a radical by heat, and a photo-radical polymerization initiator that generates a radical when irradiated with light.

The heat radical polymerization initiator may be an organic peroxide. Examples of the organic peroxide include a diacyl peroxide such as benzoyl peroxide; a peroxy ester such as t-butyl peroxybenzoate; a hydroperoxide such as cumene hydroperoxide; a dialkyl peroxide such as dicumyl peroxide; a ketone peroxide such as methyl ethyl ketone peroxide or acetylacetone peroxide; a peroxyketal; an alkyl perester; and a percarbonate.

A commercially available product can be used as the photo-radical polymerization initiator. Examples may include Irgacure (registered trademark) 651, Irgacure 184, Irgacure 2959, Irgacure 127, Irgacure 907, Irgacure 369, Irgacure 379, Irgacure 819, Irgacure 784, Irgacure OXE 01, Irgacure OXE 02 and Irgacure 754, all manufactured by BASF Corporation. These products may be used either singly or in a combination of two or more.

There is no particular limitation on the content of the polymerization initiator in the curable composition of the present invention; however, it is preferably 0.001 parts by mass or more, more preferably 0.01 parts by mass or more, and even more preferably 0.1 parts by mass or more per 100 parts by mass of the curable compound from the viewpoint of better achieving the effect of the present invention, while it is preferably 10.0 parts by mass or less, more preferably 5.0 parts by mass or less.
<Other Components>

The curable composition of the present invention may further contain components other than the above-described components, such as a diluent, a pigment, a dye, a filler, an ultraviolet absorber, a thickener, a shrinkage reducing agent, an anti-aging agent, a plasticizer, an aggregate, a flame retardant, a stabilizer, a fibrous reinforcing material, an antioxidant, a leveling agent, and an anti-sagging agent.
<Curable Composition Production Method>

There is no particular limitation on a method for producing the curable composition of the present invention. For example, the composition can be produced by mixing the curable compound, the compound (A) and the base (B), and optionally a polymerization initiator and other component(s) by a known method.

[Cured Product Production Method]

The cured product production method according to the present invention is a method comprising curing the above-described curable composition, in particular, comprising the steps of: neutralizing the base (B) contained in the curable composition of the present invention to obtain a neutralized product; and curing the neutralized product.
<Step of Obtaining Neutralized Product>

The step of obtaining a neutralized product in the production method of the present invention is a step of neutralizing the base (B) contained in the curable composition of the present invention. While there is no particular limitation on the step as long as it can neutralize the base, the neutralization is preferably performed by adding to the curable composition an acid such as hydrochloric acid, sulfuric acid, nitric acid, phosphoric acid, acetic acid, formic acid, propionic acid, oxalic acid, malonic acid, succinic acid, maleic aid, fumaric acid, or citric acid. Among them, hydrochloric acid, sulfuric acid, nitric acid and phosphoric acid, which are strong acids, are more preferred.
<Step of Curing Neutralized Product>

There is no particular limitation on a method for use in the neutralized product curing step of the present invention as long as it can cure the neutralized product, and it can be appropriately selected depending on the type of the curable composition, the type of the polymerization initiator, etc. For example, when the curable composition of the present invention contains a heat radical polymerization initiator, a method can be used which involves heating the curable composition to cure it. When the curable composition of the present invention contains a photo-radical polymerization initiator, a method can be used which involves irradiating the curable composition with active energy rays, such as UV rays, to cure the composition.

When the curable composition contains both a heat radical polymerization initiator and a photo-radical polymerization initiator, a method may be employed which involves first irradiating the curable composition with active energy rays, followed by heating of the composition. Though depending on the intended use, etc., a method which involves irradiating the curable composition with active energy rays to cure the composition is preferred because the effect of the present invention can be better achieved.

[Cured Product]

The cured product of the present invention is one obtained by curing the curable composition of the present invention. The curable composition of the present invention has excellent storage stability and exhibits excellent reactivity even after it is stored for a period of time, as described above, and can therefore form a cured product having an excellent appearance. The cured product of the present invention, because of its excellent properties and appearance, can be advantageously used as a paint film, an adhesive layer, a coating layer, or the like.

EXAMPLES

The following examples illustrate the present invention in greater detail and are not intended to limit the scope of the invention.

The following evaluation methods are used in the below-described examples and synthesis examples.

Quantitative analysis of a curable compound (MMA) by GC/FID was performed under the following conditions:
  Apparatus: GC-2014, manufactured by Shimadzu Corporation
  Column: DB-1 (Agilent J&W)
  Inlet temp.: 280° C.
  Detector temp.: 320° C.
  Oven: 50° C. (2 min)→20° C./min→300° C. (15 min)
  Split ratio: measured under the condition of 1:50
    Quantitative analysis of a curable compound (PETA) by HPLC/UV was performed under the following conditions:
  Column: L-Column2 ODS
  Eluant: liquid A=water (10 mM ammonium acetate)
    liquid B=methanol (10 mM ammonium acetate)
  Gradient: liquid B=50% (5 min)→(30 min)→100% (15 min)

Column temp.: 40° C., detection wavelength: 215 nm

The following compounds are used in Examples and Comparative Examples.

<Curable Compound>
MMA: methyl methacrylate
PETA: pentaerythritol triacrylate

<Compound (A)>

[Production Example 1] (Production of 1,3-bis(3-methyl-2-butenoxy)-2-hydroxypropane (A-1))

Under a flow of nitrogen gas, 61.8 g (0.717 mol) of 3-methyl-2-butene-1-ol and 36.84 g (0.657 mol) of potassium hydroxide were placed into a reactor equipped with a stirrer, a thermometer, and a dropping funnel. While stirring the mixture and keeping the temperature in the reactor at 10° C. or less, 19.34 g (0.209 mol) of epichlorohydrin was dropped into the mixture and, after completion of the dropping, the temperature in the reactor was raised to 50° C. The mixture was stirred at 50° C. for 6 hours, and then it was cooled to 25° C. The reaction liquid was neutralized with a 4M aqueous hydrochloric acid solution, and an upper layer of the liquid was cleaned with 310 mL of ion-exchange water. The resulting organic layer was purified by distillation to obtain 1,3-bis(3-methyl-2-butenoxy) hydroxypropane, represented by the following formula (A-1), in an amount of 28.77 g (0.126 mol, yield 60.3%):

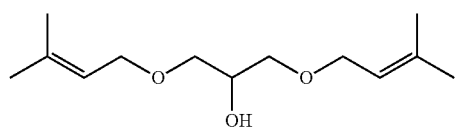

(A-1)

Reference Example 1

Synthesis of 1-(3-methyl-2-butenoxy)-2,3-epoxypropane

Under a flow of nitrogen gas, 324 g (3.77 mol) of 3-methyl-2-butene-1-ol (manufactured by Kuraray Co., Ltd.), 2300 mL of cyclohexane, 226 g (5.65 mol) of sodium hydroxide (manufactured by FUJIFILM Wako Pure Chemical Corporation), 15.2 g (37.3 mmol) of trioctylmethylammonium chloride (manufactured by Tokyo Keiki Co. Ltd.) and 226 mL of purified water were placed into a reactor equipped with a stirrer, a thermometer, and a dropping funnel. While stirring the mixture and keeping the temperature in the reactor at 25° C. or less, 698 g (7.54 mol) of epichlorohydrin (manufactured by FUJIFILM Wako Pure Chemical Corporation) was dropped into the mixture over 90 minutes and, after completion of the dropping, the temperature in the reactor was raised to 40° C. in 30 minutes. The mixture was stirred at 40° C. for 3 hours, and then it was cooled to 25° C. An upper layer of the reaction liquid was cleaned five times with 670 mL of saturated saline, and the organic layer was dried with sodium sulfate. The sodium sulfate was filtered off, and the filtrate was concentrated to obtain 536 g of concentrate. The concentrate obtained was purified by distillation to obtain 1-(3-methyl-2-butenoxy)-2,3-epoxypropane, represented by the following formula, in an amount of 242 g (1.67 mol, yield 44%):

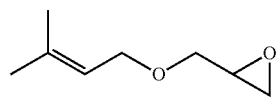

Production Example 2

Synthesis of α-methoxy-ω-hydroxypoly[oxy(3-methyl-2-butenoxymethylethane-1,2-diyl)] (A-2)

Under a flow of nitrogen gas, 20 g (0.14 mol) of 1-(3-methyl-2-butenoxy)-2,3-epoxypropane and 76 mg (1.4 mmol) of sodium methoxide (manufactured by FUJIFILM Wako Pure Chemical Corporation) were placed into a reactor equipped with a stirrer, a thermometer, and a dropping funnel. The temperature in the reactor was raised to 110° C. and the mixture was stirred for 9 hours, and then the mixture was cooled to 25° C. 1 ml of acetic acid was added to the reaction liquid, and then a low-boiling component was removed by evaporation to obtain α-methoxy-ω-hydroxypoly[oxy(3-methyl-2-butenoxymethylethane-1,2-diyl)], represented by the following formula (A-2), in an amount of 18.8 g (yield 94%). GPC measurement of the resulting compound revealed that the compound had a number average molecular weight of 4,800 and a weight average molecular weight (as calculated in terms of polystyrene) of 7,600.

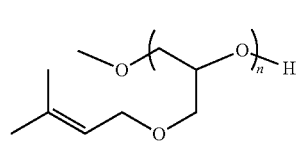

(A-2)

<Comparative Compound>
MDEA: methyldiethanolamine

<Polymerization Initiator>
Photo-polymerization initiator: Irgacure 184 (manufactured by BASF Corporation)

Examples 1 to 9 and Comparative Examples 1 and 2

Curable compositions were prepared according to the formulations set forth in Table 1 below. The curable compositions prepared were each allowed to stand at 80° C. for 7 hours. Thereafter, each curable composition was subjected to measurement of the amount of residual curable compound. A curable composition was rated "pass" in storage stability when 98% by mass or more of the curable compound remained after the 7-hour standing.

Examples 10 and 11

Each of the curable compositions of Examples 1 and 2 was neutralized with hydrochloric acid, and then applied to a polyethylene film in a thickness of 125 μm. Subsequently, the coating was irradiated with UV light (34 mW/cm$^2$) for 2 minutes to produce a cured film. An unreacted curable compound was extracted from the cured film using acetone as a solvent, and a quantitative analysis of the unreacted curable compound was performed by HPLC or GC.

TABLE 1

|  |  |  | Examples | | | | | | | | | | | Comp. Examples | |
|---|---|---|---|---|---|---|---|---|---|---|---|---|---|---|---|
|  |  |  | 1 | 2 | 3 | 4 | 5 | 6 | 7 | 8 | 9 | 10 | 11 | 1 | 2 |
| Composition [parts by mass] | Curable compound | MMA | 100.0 | — | 100.0 | 100.0 | 100.0 | 100.0 | 100.0 | 100.0 | 100.0 | 100.0 | — | 100.0 | 100.0 |
|  |  | PETA | — | 100.0 | — | — | — | — | — | — | — | — | 100.0 | — | — |
|  | Compound(A) | (A-1) | 1.0 | 1.0 | 0.2 | 2.0 | 1.0 | 1.0 | 1.0 | 1.0 | — | 1.0 | 1.0 | — | — |
|  |  | (A-2) | — | — | — | — | — | — | — | — | 1.0 | — | — | — | — |
|  | Comparative compound | MDEA | — | — | — | — | — | — | — | — | — | — | — | 1.0 | — |
|  | Base(B) | Triethylamine | 0.1 | 0.1 | 0.1 | 0.1 | 0.5 | — | — | — | 0.1 | 0.1 | 0.1 | 0.1 | — |
|  |  | Trioctylamine | — | — | — | — | — | 0.1 | — | — | — | — | — | — | — |
|  |  | NaOH | — | — | — | — | — | — | 0.1 | — | — | — | — | — | — |
|  |  | NaOMe | — | — | — | — | — | — | — | 0.1 | — | — | — | — | — |
|  | Polymerization initiation | Irgacure 184 | 1.0 | 1.0 | 1.0 | 1.0 | 1.0 | 1.0 | 1.0 | 1.0 | 1.0 | 1.0 | 1.0 | 1.0 | 1.0 |
|  | Pretreatment (neutralization operation) |  | — | — | — | — | — | — | — | — | — | done | done | — | — |
| Evaluation | Amount of residual curable compound (mass %) |  | 99.4 | 99.4 | 99.6 | 98.1 | 99.2 | 100 | 98.1 | 98.9 | 98.7 | — | — | 91.7 | 91.2 |
|  | Reaction rate of curable compound after storage (mass %) |  | — | — | — | — | — | — | — | — | — | 96.0 | 97.0 | — | — |

It is apparent from the results of Table 1 that the curable compositions of the present invention, which use the compound (A) having a structure represented by the general formula (I) in combination with the base (B), have excellent storage stability without a reaction of the curable compound occurring during storage of the composition. Further, it is apparent from the results of Examples 10 and 11 that by neutralizing the base in the respective curable composition after its storage, the composition can then be cured quickly.

In contrast, the curable composition of Comparative Example 1, which uses methyldiethanolamine (MDEA), a common curing accelerator, has poor storage stability. MDEA accelerates curing of the curing liquid even during its storage, leading to the poor storage stability. The data obtained thus indicates that compared to the use of a common curing accelerator, the use of a combination of the compound (A) and the base (B) produces excellent curing accelerating effect and achieves excellent storage stability of the curable composition.

The invention claimed is:

1. A curable composition comprising, per 100 parts by mass of a curable compound, 0.1 to 10.0 parts by mass of a compound (A), and 0.01 to 10.0 parts by mass of a base (B):
   wherein the compound (A) is a compound represented by the following general formula (II):

$$\text{(II)}$$

where $R^5$ and $R^6$ each independently represent an alkyl group having 1 to 6 carbon atoms, an alkenyl group having 2 to 6 carbon atoms, an aryl group, or an aralkyl group, $R^7$ and $R^8$ each independently represent a hydrogen atom, an alkyl group having 1 to 6 carbon atoms, an alkenyl group having 2 to 6 carbon atoms, an aryl group, or an aralkyl group, $R^9$ represents a hydrogen atom, an alkyl group having 1 to 6 carbon atoms, an alkenyl group having 2 to 6 carbon atoms, an aryl group, or an aralkyl group, $R^{10}$ represents a hydrogen atom, a (meth)acryloyl group, a 4-vinylphenyl group, or an alkenyl group having 2 to 6 carbon atoms, and n is an arbitrary integer.

2. The curable composition according to claim 1, wherein the base (B) is at least one selected from sodium hydroxide, sodium methoxide, triethylamine, and trioctylamine.

3. A cured product obtained by curing the curable composition according to claim 1.

4. A method for producing a cured product, comprising curing the curable composition according to claim 1.

* * * * *